United States Patent
Priemer et al.

(10) Patent No.: US 6,882,921 B2
(45) Date of Patent: Apr. 19, 2005

(54) TRACTION CONTROL ALGORITHM FOR VEHICLE OPERATION UPON DEFORMABLE ROAD SURFACES

(75) Inventors: Douglas J. Priemer, Fraser, MI (US); Bernard W. Dumm, Loveland, OH (US)

(73) Assignee: Kelsey-Hayes Company, Livonia, MI (US)

( * ) Notice: Subject to any disclaimer, the term of this patent is extended or adjusted under 35 U.S.C. 154(b) by 55 days.

(21) Appl. No.: 10/332,258

(22) PCT Filed: Jul. 6, 2001

(86) PCT No.: PCT/US01/21424
§ 371 (c)(1),
(2), (4) Date: Jan. 6, 2003

(87) PCT Pub. No.: WO02/04242
PCT Pub. Date: Jan. 17, 2002

(65) Prior Publication Data
US 2004/0098188 A1 May 20, 2004

Related U.S. Application Data
(60) Provisional application No. 60/216,248, filed on Jul. 6, 2000.

(51) Int. Cl.⁷ .............................................. B60K 28/16
(52) U.S. Cl. ............................. 701/86; 701/73; 701/80; 180/197
(58) Field of Search .............................. 701/71, 72, 73, 701/75, 78, 80, 82, 86, 90; 180/197

(56) References Cited

U.S. PATENT DOCUMENTS

| | | | |
|---|---|---|---|
| 4,651,290 A | * 3/1987 | Masaki et al. ................ 701/80 |
| 5,224,043 A | 6/1993 | Tamura et al. ................ 701/86 |
| 5,341,298 A | 8/1994 | Singleton et al. ............. 701/91 |
| 5,407,257 A | 4/1995 | Iwata ..................... 303/122.09 |
| 5,445,125 A | 8/1995 | Allen ......................... 123/399 |
| 5,469,359 A | 11/1995 | Tsuyama et al. .............. 701/90 |
| 5,511,865 A | 4/1996 | Howell ....................... 303/139 |
| 5,513,907 A | 5/1996 | Kiencke et al. ............. 303/150 |
| 5,518,307 A | * 5/1996 | Okazaki ..................... 303/159 |
| 5,539,643 A | 7/1996 | Yamamoto et al. ........... 701/85 |
| 5,627,755 A | * 5/1997 | Negrin ........................ 701/74 |
| 5,668,740 A | * 9/1997 | Wang et al. .................. 701/70 |
| 5,707,121 A | * 1/1998 | Harris et al. ................ 303/194 |
| 5,732,376 A | 3/1998 | Hrovat et al. ................ 701/80 |
| 5,944,392 A | 8/1999 | Tachihata et al. .......... 303/112 |
| 6,109,704 A | * 8/2000 | Batistic ..................... 303/194 |

FOREIGN PATENT DOCUMENTS

EP 0 574 150 12/1993

* cited by examiner

*Primary Examiner*—Tan Q. Nguyen
(74) *Attorney, Agent, or Firm*—MacMillan, Sobanski & Todd, LLC

(57) ABSTRACT

A vehicle traction control system is actuated when driven wheel slip ($S_1$) exceeds a predetermined slip threshold ($T_s$) to reduce the amount of driven wheel slip ($S_1$) by reducing the driven wheel speed. The traction control system also monitors vehicle deceleration. Upon detecting that the vehicle is decelerating and that the vehicle deceleration has exceed a deceleration threshold, the traction control system determines that the vehicle has encountered a deformable surface such as mud or deep snow. Upon detecting entry onto a deformable surface, the slip threshold ($T_s$) is linearly increased over a period of time to increase the driven wheel speed and thereby allow the wheels to churn through the deformable surface.

28 Claims, 11 Drawing Sheets

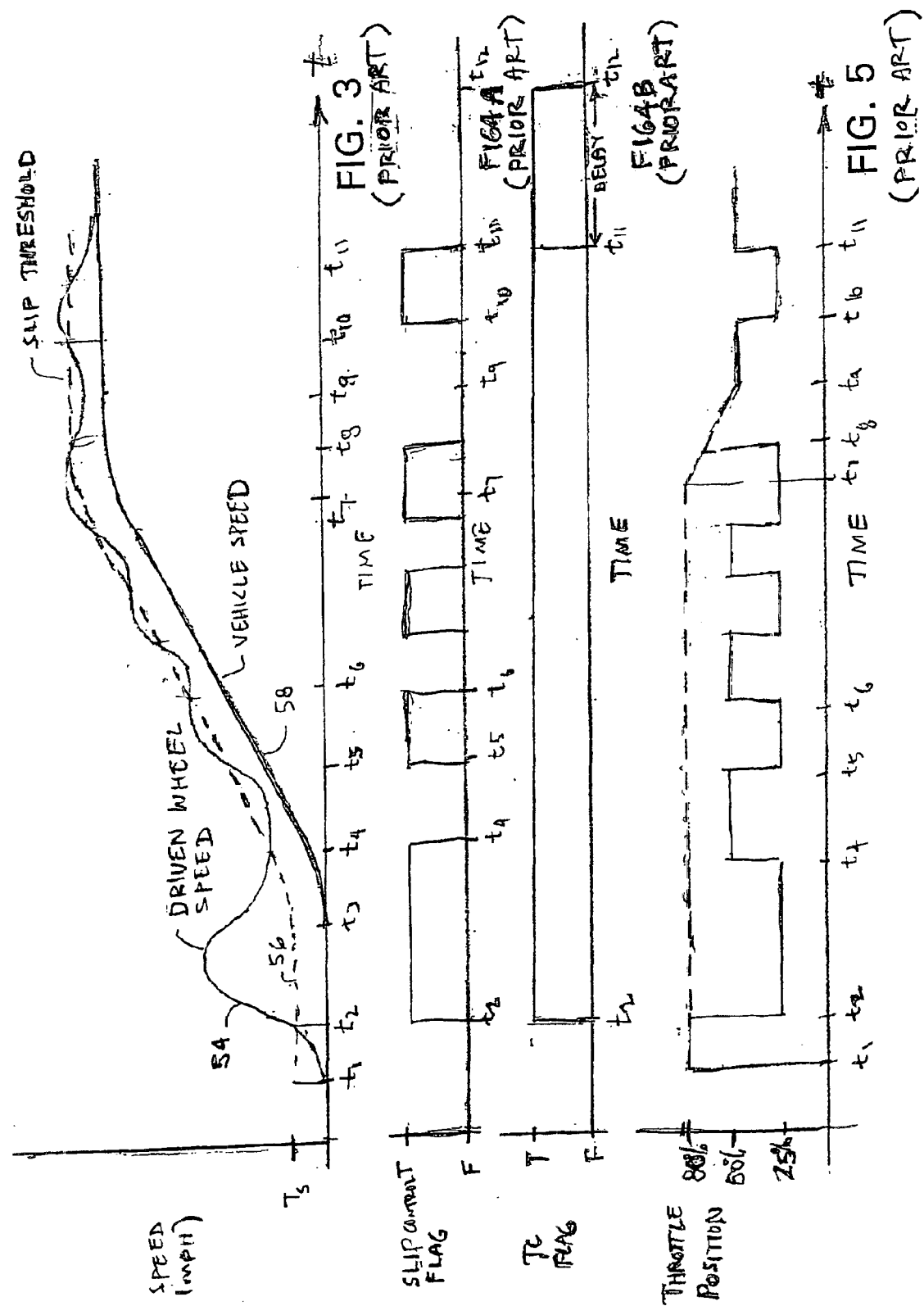

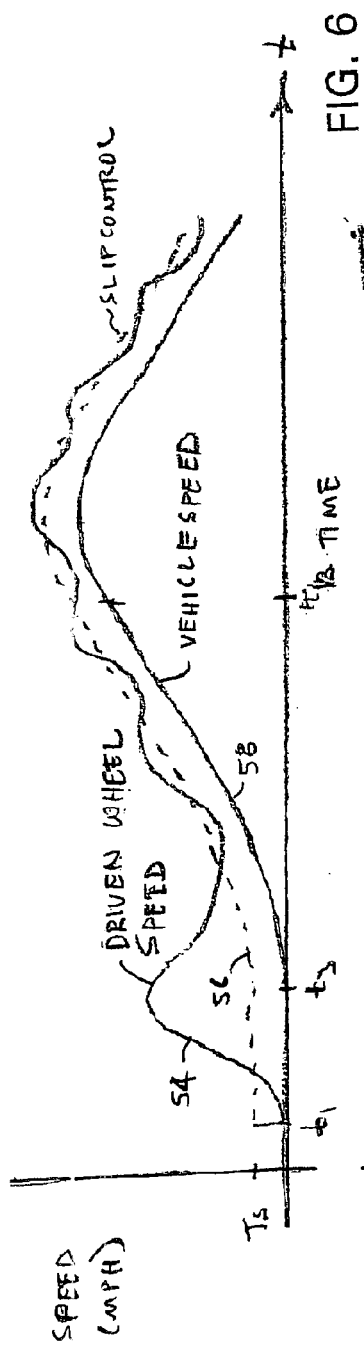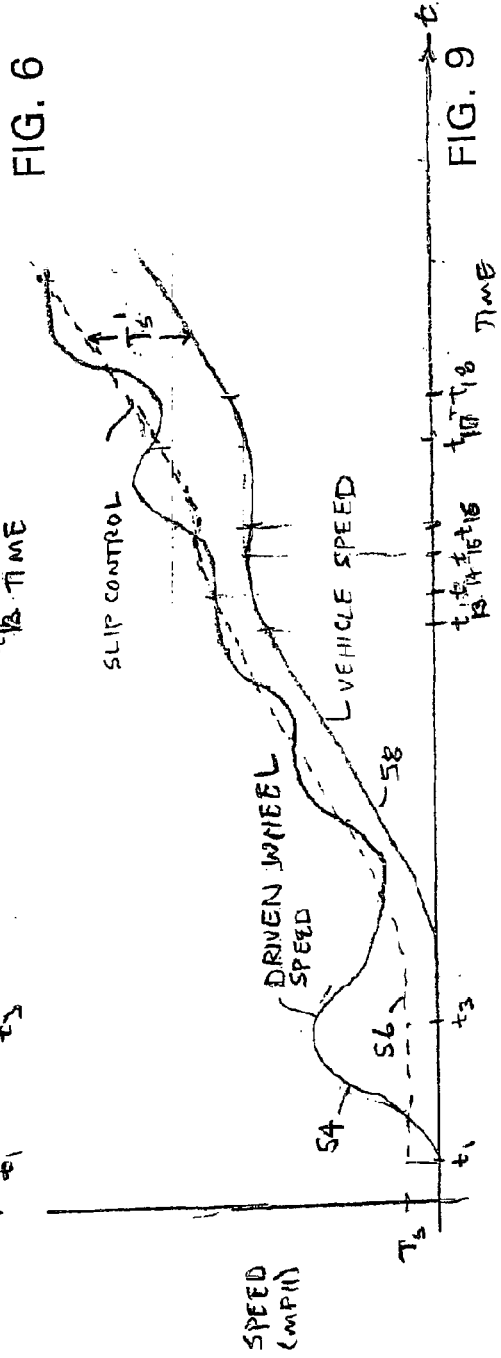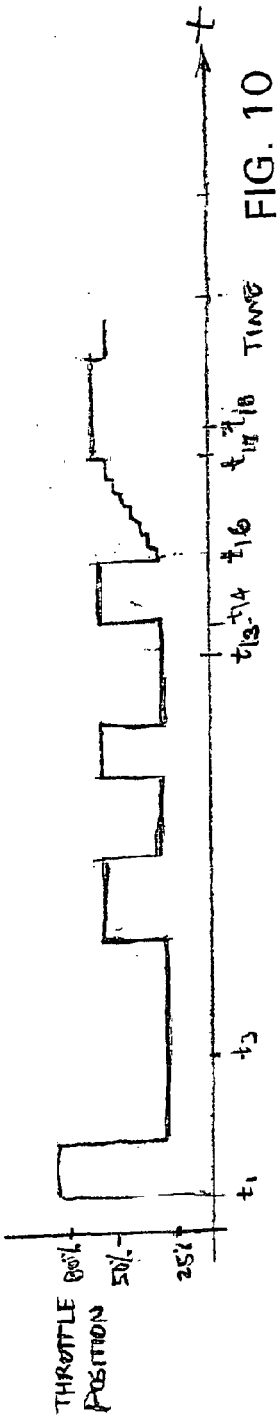

TRACTION CONTROL ALGORITHM FOR VEHICLE OPERATION UPON DEFORMABLE ROAD SURFACES

This application claims the benefit of provisional application No. 60/216,248, filed Jul. 6, 2000.

BACKGROUND OF THE INVENTION

This invention relates in general to vehicle traction control systems and in particular to a traction control algorithm which compensates for operation upon a deformable road surface.

Many new vehicles include traction control systems for controlling the slippage of individual driven wheels upon low mu road surfaces during vehicle acceleration. Traction control systems are designed to maximize traction while providing optimized acceleration and stability. A number of conventional methods are available to implement a traction control system. Such methods include purely mechanical methods such as, for example, four wheel drive, limited slip differentials and locking differentials. Alternately, pure electronic methods also exist, such as control of an electronic engine throttle to reduce engine torque when slippage of the driven wheels is encountered. Also, there are know traction control systems that integrate electronics with mechanical operation For example, traction control is often integrated with an anti-lock brake system. The solenoid valves that control the amount of hydraulic pressure supplied to wheel brakes to reduce wheel slip during vehicle braking also can be used to brake a slipping driven wheel when excessive slippage occurs during vehicle acceleration. One such system reduces drive wheel slippage by retarding ignition timing, reducing fuel flow to the engine and cutting off selected engine cylinders in conjunction with application of individual wheel brakes.

Referring now to the drawings, FIG. 1 is a schematic diagram of a typical Traction Control (TC) system 10. The TC system 10 is illustrated for a rear wheel drive vehicle (not shown). The vehicle includes an engine 12 that provides power through a transmission 14 and differential 16 to a pair of driven wheels 18. As shown in FIG. 1, the vehicle also includes a pair of non-driven steerable front wheels 19. While a rear wheel drive vehicle is shown in FIG. 1, it will be appreciated that the following discussion also applies to front wheel drive vehicles. The vehicle further includes a powertrain control module (PCM) 20 that is electrically connected to the engine 12 and transmission 14 and an accelerator pedal 15. The PCM 20 is responsive to an electrical signal indicating a vehicle accelerator position to generate throttle position commands to control engine output torque and transmission shift commands. A typical PCM is described in U.S. Pat. No. 5,445,125.

The PCM 20 also is electrically connected to a TC controller 22. While the TC controller 22 is shown as a stand alone component in FIG. 1, it will be appreciated that the TC controller 22 can be integrated into an anti-lock brake system electronic control module or even the PCM 20. The TC controller 22 includes a TC microprocessor 24 that receives wheel speed signals from front wheel speed sensors 26 that monitor the speed of the front vehicle wheels 19 and from rear wheel speed sensors 28 that monitor the speed of the vehicle rear wheels 18.

The TC microprocessor 24 follows instructions contained in a TC algorithm that is stored in a read only memory (not shown). The microprocessor 24 is responsive to the TC algorithm instructions to sense the speed of the non-driven front wheel 19 calculate a vehicle speed from the sensed wheel speeds. The microprocessor 24 also senses the speed of each of the driven rear wheels 18. The microprocessor 24 then determines the difference between the individual driven rear wheel speeds and the vehicle speed. The difference between the driven rear wheel speed and the vehicle speed is referred to as rear wheel slip.

A typical TC algorithm allows a limited amount of slip in the driven wheels before actuating traction control measures. Accordingly, the TC microprocessor 24 continuously monitors each of the rear wheels 18 for excessive slip, as defined by the rear wheel slip exceeding a predetermined slip threshold, $T_s$. The slip threshold $T_s$ is selected in accordance with individual vehicle characteristics. A typical slip threshold $T_s$ is two miles per hour. Upon detection that the slip of a driven wheel exceeds the slip threshold $T_s$, the microprocessor 24 actuates a traction control measure to reduce the excessive slippage of the driven wheel 18.

A typical TC algorithm is illustrated by the flow chart 30 shown in FIG. 2. The flow chart 30 is entered through block 32 periodically, as determined by the vehicle characteristics. For example, the TC algorithm may be entered every five milliseconds. The algorithm utilizes two flags, a Slip Control Flag, SCFLAG, and a Traction Control Flag, TCFLAG. The use of the two flags, SCFLAG and TCFLAG, will be described below; however, both flags are initially set False.

The algorithm proceeds to functional block 33, where a first wheel slip, $S_1$, of one of the driven wheels 18 is determined. The algorithm then advances to decision block 34. In the decision block 34, the first wheel slip $S_1$ is compared to the slip threshold $T_s$. If the first wheel slip $S_1$ is greater than the slip threshold $T_s$, the algorithm branches to functional block 35 where the Slip Control Flag, SCFLAG, is set True. The algorithm then continues to decision block 36, which will be described below.

If, in the decision block 34, the first wheel slip $S_1$ is less than, or equal to, the slip threshold $T_s$, the algorithm branches to functional block 37 where a second wheel slip, $S_2$, of the other driven wheel is determined. The algorithm then advances to decision block 38. In the decision block 38, the second wheel slip $S_2$ is compared to the slip threshold $T_s$. If the second wheel slip $S_2$ is greater than the slip threshold $T_s$, the algorithm branches to functional block 35 and the Slip Control Flag, SCFLAG, is set True. The algorithm then continues to decision block 36.

In decision block 36, the TC microprocessor 24 determines if the current pass is the first pass through this portion of the algorithm. If the current pass is the first pass, the algorithm branches to functional block 39, where the Traction Control Flag, TCFLAG, is set True. The algorithm then proceeds to functional block 40. If the current pass is not the first pass in decision block 36, the algorithm proceeds directly to functional block 40.

In functional block 40, the TC microprocessor 24 activates a conventional traction control measure, such as the ones described above. For example the engine throttle can be partially closed and/or the brakes of the excessively slipping wheel applied. Additionally, the ignition timing of the engine may be retarded and/or some of the engine cylinders cut off. The algorithm then exits through block 42. Upon exiting the algorithm, the TC microprocessor 24 will wait for the predetermined time period and then reenter the algorithm through block 32.

If, in decision block 38, the second wheel slip $S_2$ is less than, or equal to, the slip threshold $T_s$, the algorithm branches to functional block 44 where the Slip Control Flag, SCFLAG, is set False. This will occur when the traction control measures applied in functional block 40 cause the driven wheel slip to fall below the slip threshold, $T_s$, or when there is no excessive driven wheel slip. The algorithm then continues to decision block 45.

In decision block 45, the TC microprocessor 24 determines the status of the Traction Control Flag, TCFLAG. If the TCFLAG is true, the traction control has been previously activated. Although the driven wheels are no longer excessively slipping, it is desirable to allow the driven wheels to "spin-up" in speed to determine is the vehicle is still operating upon a low mu surface. Accordingly, the algorithm includes a traction control end delay timer, (not shown) which begins running when the driven wheel speed falls below the slip threshold, $T_s$. If the driven wheel slip does not again exceed the slip threshold, $T_s$, within the end delay, the traction control is deactivated and control of the vehicle speed is returned to the vehicle operator. A predetermined time period is used for the traction control end delay, which, in the preferred embodiment, is two seconds. Thus, if the TCFLAG is True in decision block 45, the algorithm transfers to decision block 46, where the TC end delay timer is checked. If the timer has not expired, the algorithm proceeds to functional block 47 where the torque being applied to the driven wheels is increased by reversing the measures applied in functional block 40. The increased torque causes the driven wheels to begin spinning-up. The algorithm then exits through block 42.

If, in decision block 46, the TC microprocessor 24 determines that the TC end delay timer has run, the algorithm branches to functional block 48 where the Traction Control Flag, TCFLAG, is set False. The algorithm then exits through block 42. Accordingly, during the next pass through the algorithm, if the driven wheel slip remains below the slip threshold, $T_s$, the algorithm will branch from decision block 45 to functional block 50 where full control of the vehicle speed is returned to the vehicle operator. The algorithm then exits through block 42.

A TC system that utilizes throttle control position is illustrated in FIGS. 3 through 5. In FIG. 3, the vehicle and drive wheel speeds are shown as a function of time. The status of the Slip Control and Traction Control Flags, SCFLAG and TCFLAG, are shown in FIGS. 4A and 4B, respectively, while the throttle opening position is shown in FIG. 5. At $t_1$, the vehicle operator depresses the accelerator pedal 15 while the vehicle is on a slippery, or low mu, surface. For illustrative purposes, it is assumed that the initial accelerator pedal position calls for an 80 per cent throttle opening, as shown in FIG. 5. It will be appreciated that the following discussion also applies to other initial throttle openings.

Following the depression of the accelerator pedal 15, at least one of the driven wheels 18 begins to spin upon the low mu surface, as shown by the solid curve labeled 54 in FIG. 3, while the vehicle does not move. While the speed of only one driven wheel is illustrated in FIG. 3, it will be appreciated that the following discussion applies to both driven wheels. At $t_2$, the driven wheel speed exceeds the slip threshold $T_s$, which is shown as a dashed line labeled 56 in FIG. 3. Accordingly, both Slip Control and Traction Control Flags are set True, as shown in FIGS. 4A and 4B. With both flags set True, the TC microprocessor 24 implements a TC measure, which, for illustrative purposes, consists of reducing the throttle opening to 25 per cent. It will be appreciated that other reduced throttle openings also can be utilized. Additionally, as described above, other conventional TC methods also can be implemented to reduce the slippage of the driven wheel. In response to the reduced throttle opening, the speed of the slipping driven wheel passes through a maximum and then begins to decrease.

At $t_3$, the vehicle begins to move, as shown by the solid curve labeled 58 in FIG. 3. As the curve 58 representing the vehicle speed moves in an upward direction in FIG. 3, the TC threshold curve 56 also increases to maintain a difference between the threshold curve 56 and the vehicle speed curve 58 which is equal to the slip threshold $T_s$. The driven wheel speed 54 falls below the threshold curve 56 at $t_4$. Accordingly, the Slip Control Flag is set False and torque supplied to the driven wheels is increased. For illustrative purposes, the increase of torque is shown by opening the throttle to 50 percent in FIG. 5. In the preferred embodiment, the amount of throttle opening is a function of the road surface mu, with a greater opening being used on higher mu surfaces. It will be appreciated that other throttle settings or other methods can be used to increase torque. The driven wheel speed then begins to increase and again crosses over the threshold curve 56 at $t_5$. Accordingly, the Slip Control Flag is again set True and the Throttle reduced to a 25 per cent opening, as shown in FIGS. 4A and 5.

The TC continues to operate as described above with the driven wheel speed oscillating above and below the slip threshold curve 56 until the vehicle operator partially lifts his foot on the accelerator pedal 15 at $t_7$. Due to operation of the TC system, the altered throttle position does not appear in FIG. 5 until $t_8$. However, the vehicle speed reaches a constant value at $t_9$ and the slipping driven wheel speed eventually becomes equal to the vehicle speed, as shown to the right in FIG. 3. Although the Slip Control Flag becomes false at $t_{11}$, the Traction Control Flag remains true until $t_{12}$, when the flag is set False. This represents the end delay period for the traction control.

SUMMARY OF THE INVENTION

This invention relates to a traction control algorithm which compensates for operation upon a deformable road surface.

When a vehicle equipped with traction control is operated upon a deformable surface, such as sand, loose gravel, mud or snow, the traction control is operative to limit the slip of the driven wheels to a predetermined amount. Under such conditions, limiting the slip can result in deceleration of the vehicle. Such a situation is illustrated in FIG. 6, where, at $t_{13}$, the vehicle encounters deep snow. Prior to $t_{13}$, the vehicle is operating upon a low mu surface with the traction control actuated, as described above. The curves shown in FIG. 6 are labeled the same as the corresponding curves shown in FIG. 3. After $t_{13}$, the increased resistance encountered by the vehicle wheels as they push through the snow causes the vehicle speed to decrease, as shown by the vehicle speed curve 58. Because the TC threshold curve 56 is offset from the vehicle speed curve 58 by the fixed amount of the slip threshold $T_s$, the TC threshold curve 56 also decreases. The reduction of the TC threshold curve 56 causes the TC system to control the driven wheel speed to a progressively decreasing target. As a result, the vehicle slows to a stop. Accordingly, it would be desirable to increase the amount of slip permitted by the traction control for the driven wheels when the vehicle is operated upon snow covered or other deformable surfaces to allow the driven wheels to churn through the deformable surface material.

The present invention contemplates a traction control system for a vehicle that includes a plurality of wheel speed sensors adapted to sense the speed of associated vehicle wheels and are operative to generate wheel speed signals. The system also includes a microprocessor electrically connected to the wheel speed sensors. The microprocessor is operative to monitor the wheel speed signals and calculate a wheel slip for each of said driven wheels and a vehicle deceleration. The microprocessor also is operative upon a driven wheel slip exceeding a slip threshold to reduce the driven wheel slip below the slip threshold. The microprocessor is further operative to monitor the vehicle deceleration and to increase the slip threshold upon the vehicle deceleration exceeding a predetermined deceleration threshold.

The slip threshold is increased as a function of time. The system further includes a maximum limit for the slip threshold whereby the slip threshold is increased to a maximum slip threshold limit and then held at the maximum slip threshold limit.

In the preferred embodiment, the slip threshold is increased by a slip threshold increment, the slip threshold increment being calculated in accordance with the formula:

$$\Delta T_s = K_S * f(SANDCNT);$$

where $\Delta T_s$=the slip threshold increment;
$K_S$ is a constant to scale the maximum value for the incremental increase $\Delta T_s$; and
SANDCNT=the current value of an iteration counter.

The microprocessor is further operative upon the vehicle deceleration falling below the deceleration threshold to reduce the slip threshold back to an initial slip threshold.

The invention also contemplates that the microprocessor can be operative while the driven wheel slip exceeds the slip threshold to monitor the vehicle deceleration and to increase the slip threshold upon the vehicle deceleration exceeding the predetermined deceleration threshold.

The invention further contemplates including a torque requirement sensor adapted to sense a torque requirement of a vehicle engine. The torque sensor is connected to the microprocessor with the microprocessor operative to monitor the vehicle deceleration and torque requirement and to increase said slip threshold upon the vehicle deceleration exceeding a predetermined deceleration threshold and the torque requirement exceeding a predetermined torque threshold. As above, the slip threshold is increased as a function of time.

In the preferred embodiment, the slip threshold is increased by a slip threshold increment, the slip threshold increment being calculated in accordance with the formula:

$$\Delta T_s = [KSANDMULT*(TPS-MINTQR)*SANDCNT]/(256-MINTPS);$$

where $\Delta T_s$=the slip threshold increment;
KSANDMULT=a constant to scale the maximum value for the incremental increase $\Delta T_s$;
TPS=actual throttle opening;
MINTQR=the predetermined minimum torque threshold; and
SANDCNT=the current value of an iteration counter.

Also in the preferred embodiment, the torque requirement is proportional to an engine throttle opening and further the minimum torque threshold is proportional to a minimum engine throttle opening.

The invention also contemplates that the microprocessor is further operative, while the driven wheel exceeds the slip threshold, to monitor the vehicle deceleration and torque requirement and to increase the slip threshold upon the vehicle deceleration exceeding a predetermined deceleration threshold and the torque requirement exceeding a predetermined torque threshold.

It is also contemplated that the deceleration threshold is a first deceleration threshold and further that the microprocessor is operative to calculate a lateral acceleration of the vehicle. Upon detecting a vehicle lateral acceleration in excess of a predetermined lateral acceleration threshold, the microprocessor is operative to replace the first deceleration threshold with a second deceleration threshold, with the second deceleration threshold being greater than the first deceleration threshold. The system can further include a predetermined time delay which is actuated upon the vehicle deceleration exceeding the deceleration threshold and runs prior to any increase of the slip threshold.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a plot of vehicle speed vs. time which is illustrative of the operation of the prior art traction control system shown in FIG. 1.

FIG. 4A is a plot showing the status of a Slip Control Flag that corresponds to the plot shown in FIG. 3 for the prior art traction control system.

FIG. 4B is a plot showing the status of a Traction Control Flag that corresponds to the plot shown in FIG. 3 for the prior art traction control system.

FIG. 5 is plot showing the engine throttle setting under the control of the prior art traction control system shown in FIG. 1.

FIG. 6 is an illustration of an operational problem associated with the prior art traction control system shown in FIG. 1.

FIG. 9 is a plot of vehicle speed vs. time which is illustrative of the operation of the traction control system having the traction control system algorithm shown in FIG. 7.

FIG. 10 is a plot showing the engine throttle setting under the control of the traction control system algorithm shown in FIG. 7.

DETAILED DESCRIPTION OF THE PREFERRED EMBODIMENT

Figure 1:
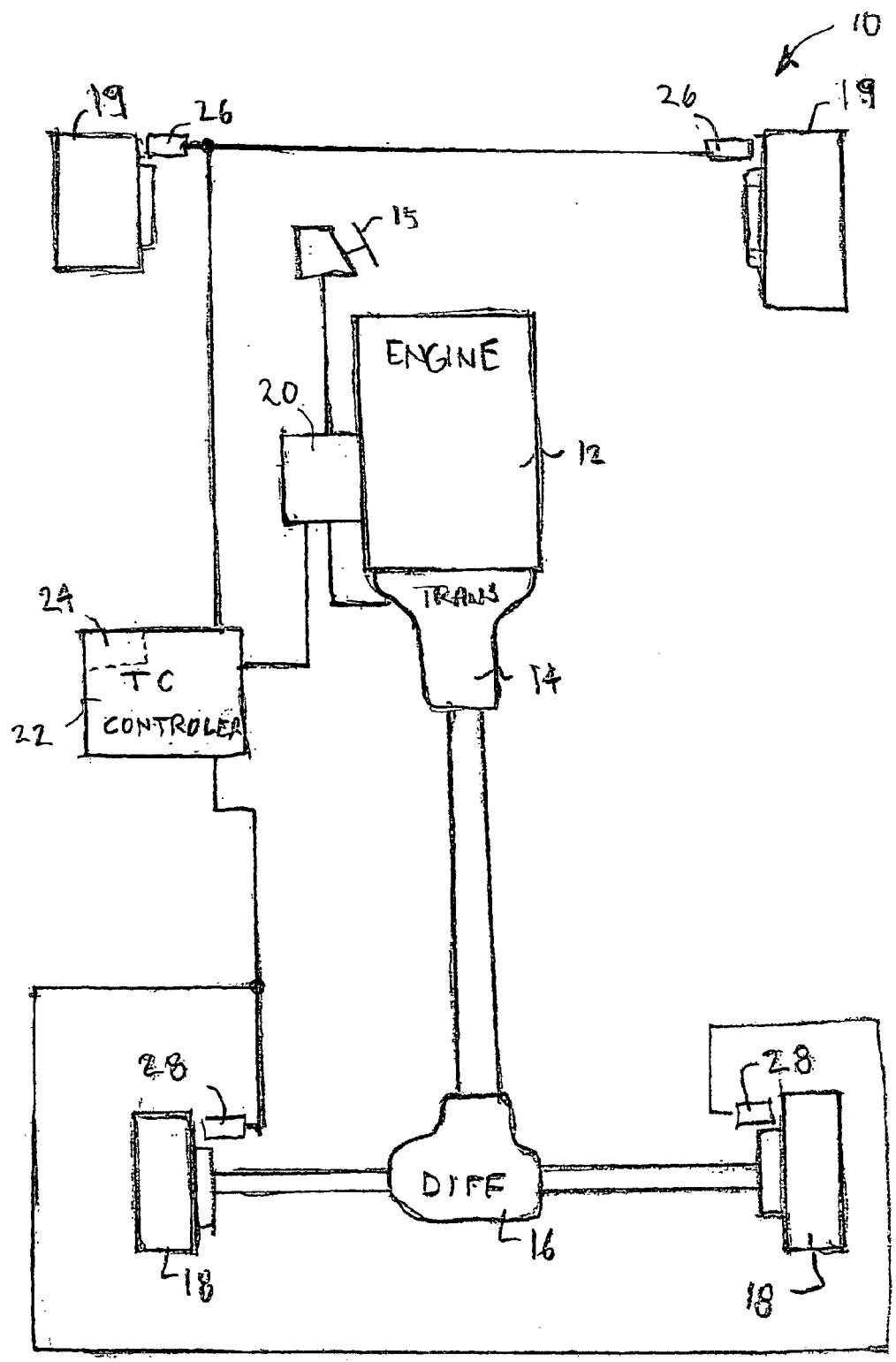
FIG. 1 is a schematic diagram of a typical prior art traction control system.
Figure 2:
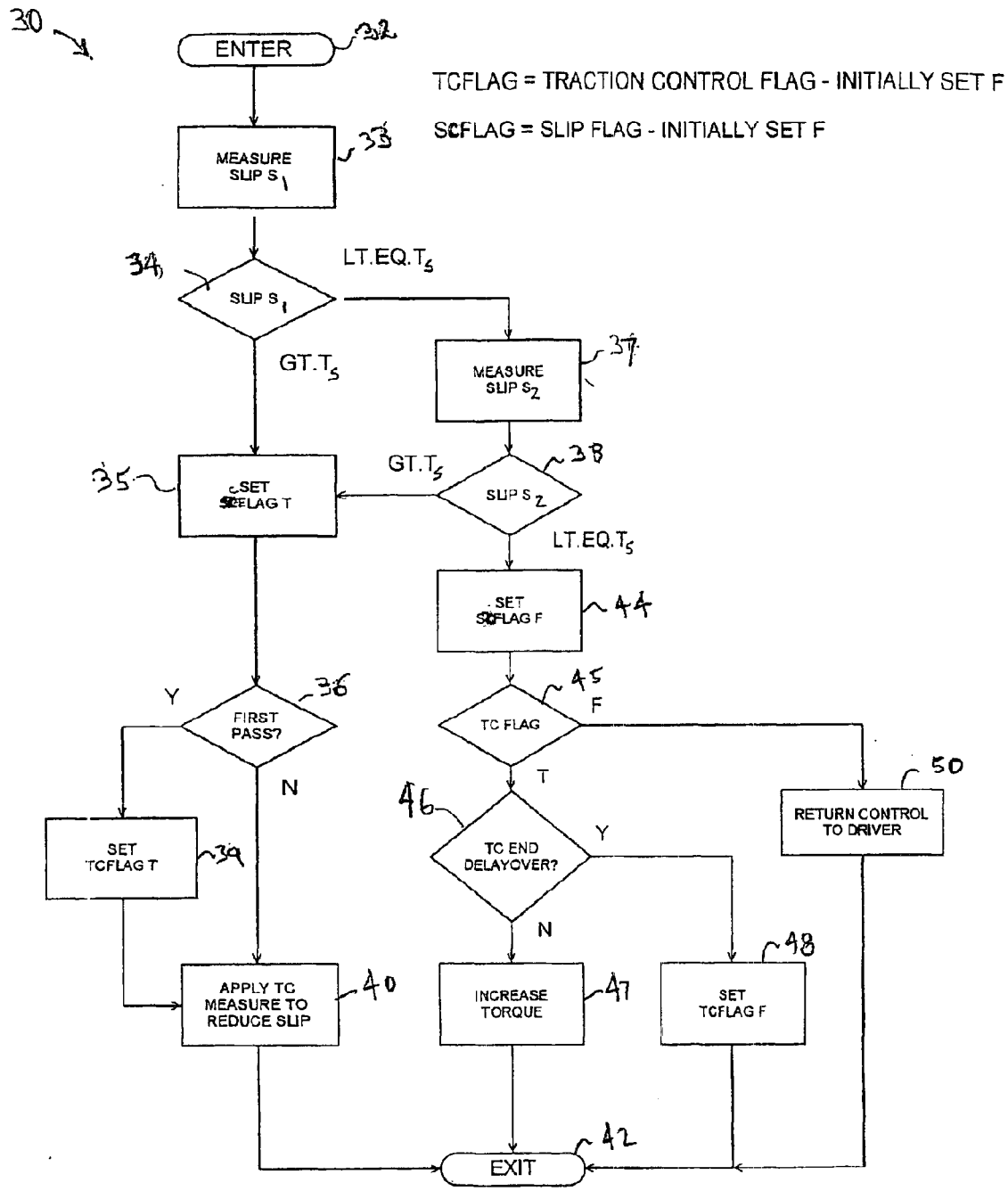
FIG. 2 is a flow chart of an algorithm for the operation of the prior art traction control system shown in FIG. 1.
Figure 7:
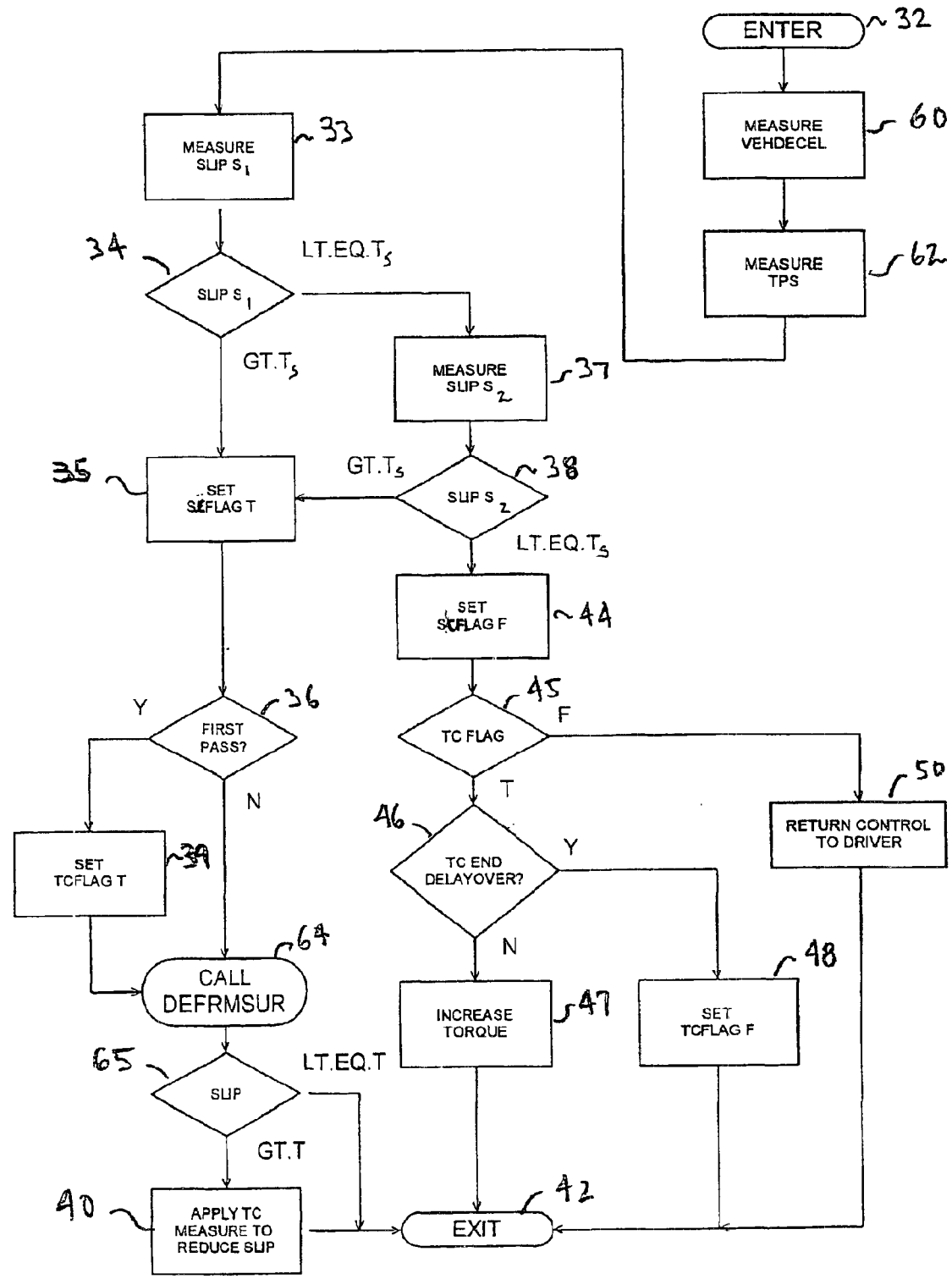
FIG. 7 is a flow chart for an algorithm for the operation of a traction control system in accordance with the invention.

Referring again to the drawings, there is illustrated in FIG. 7, a flow chart for an improved TC algorithm that increases the slip threshold $T_s$ when the vehicle is operating on a deformable surface and the traction control is active. Blocks shown in FIG. 7 that are identical to blocks shown in FIG. 2 have the same numerical designators. When it has been determined that the TC is actuated and the vehicle is operating upon a deformable surface, the improved TC algorithm gradually incrementally increases the slip threshold $T_s$ for vehicle operation upon a deformable surface. The increased slip threshold allows the driven wheels to spin at a higher speed to allow the wheels to churn through the deformable surface. The increased slip threshold is limited to a maximum value, which in the preferred embodiment, is ten miles per hour. The slip threshold $T_s$ is increased gradually to avoid loss of control of the vehicle due to a sudden change of the throttle opening.

As described above, vehicle deceleration encountered during operation of a TC system is an indicator that the vehicle is operating upon a deformable surface. Accordingly, the improved TC algorithm monitors the rate of change of vehicle speed in functional block 60 and calculates the time rate of change of the speed to determine whether the vehicle is decelerating, as indicated by a negative acceleration. The improved algorithm also measures the engine throttle position TPS in functional block 62. In the preferred embodiment, TPS is determined by measuring the amount of depression of the accelerator pedal 15. The improved algorithm then continues as described above. After checking the driven wheels for slip in excess of the slip threshold $T_s$ and setting the Slip Control Flag, SCFLAG, True in functional block 35, the improved algorithm proceeds to functional block 64 and calls a Deformable Surface (DEFRMSUR) subroutine.

Figure 8:
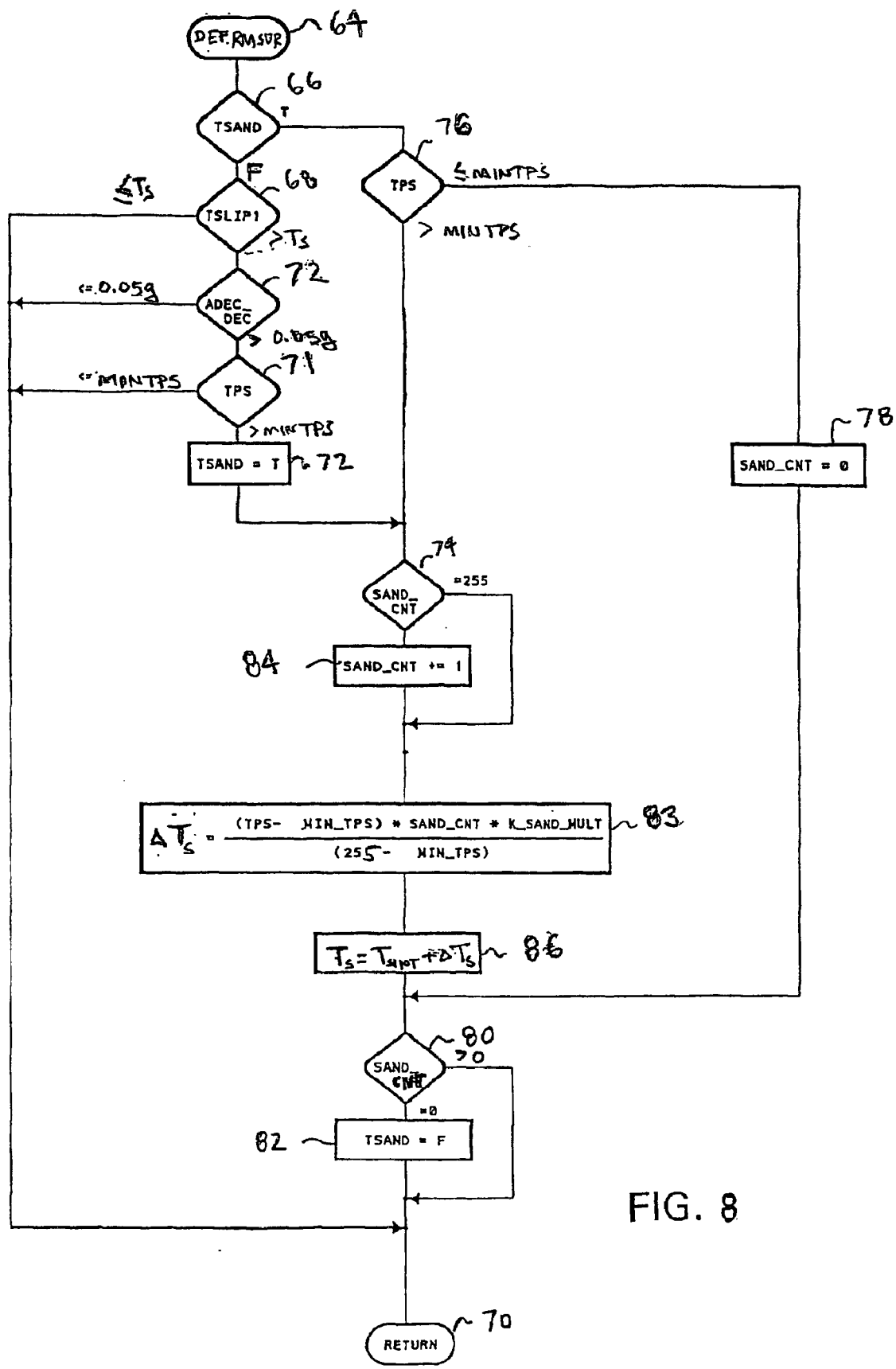
FIG. 8 is a flow chart for a subroutine included in the flow chart shown in FIG. 7.

A flow chart for DEFRMSUR is shown in FIG. 8. The flow chart for the subroutine DEFRMSUR is shown for one driven wheel 18 in FIG. 8. In the preferred embodiment, the subroutine is run for each of the driven wheels 18. Alternately, logic could be provided (not shown) to select the driven wheel with the greater value of slip S and then apply DEFRMSUR to the driven wheel having the greater slip. As will be described below, DEFRMSUR determines whether the vehicle is actually operating upon a deformable surface. If the vehicle is operating upon a deformable surface, the subroutine incrementally increases the slip threshold $T_s$.

Upon exiting the subroutine DEFRMSUR, the algorithm continues to decision block 65 to determine if the driven wheel slip still exceeds the increased slip threshold calculated in the subroutine DEFRMSUR. If the driven wheel slip has fallen below the increased slip threshold, the algorithm exits through block 42. If the driven wheel speed exceeds the increased slip threshold, the algorithm proceeds to functional block 40 where the slip is controlled to the increased slip threshold calculated in the subroutine DEFRMSUR. For illustrative purposes, the TC measure consists of closing the engine throttle opening to reduce the torque delivered to the driven wheels; however, other TC measures can be applied, such as, for example, applying the brakes associated with the spinning driven wheel or locking the differential. Following the slip control step, the algorithm exits through block 42.

As described above, a flow chart for the subroutine DEFRMSUR is shown in FIG. 8. The subroutine is entered through block 64 and proceeds to decision block 66 where a subroutine Flag TSAND is checked to determine whether the subroutine is active. If the TSAND Flag is False, the subroutine branches to decision block 68 where the driven wheel slip is again compared to the slip threshold $T_s$ to determine that TC is still is required. If the driven wheel speed has fallen below, or is equal to, the slip threshold $T_s$, the subroutine exits back to the TC algorithm through block 70.

If the driven wheel speed is greater than the slip threshold $T_s$, the subroutine proceeds to decision block 72 where the magnitude of the vehicle deceleration is compared to a deceleration threshold $T_{dec}$. The deceleration threshold $T_{dec}$ is selected to match the characteristics of the particular vehicle. In the preferred embodiment the deceleration threshold $T_{dec}$ is 0.05 g, as shown in FIG. 8. If the magnitude of the vehicle deceleration is less than, or equal to, $T_{dec}$, the subroutine has determined that the vehicle is not operating upon a deformable surface and exits through return block 70 to apply a TC measure to the excessively slipping driven wheel, as described above. If the magnitude of the vehicle deceleration is greater than $T_{dec}$, the subroutine has determined that the vehicle is operating upon a deformable surface and transfers to decision block 71.

In decision block 71, the actual throttle opening position TPS, as measured in functional block 62, is compared to a minimum value, MINTPS, which represents the engine idle speed. For illustrative purposes, MINTPS corresponds to a 25 per cent throttle opening. If the throttle opening is less than or equal to the MINTPS, the subroutine exits through block 70 to the TC algorithm. If TPS is greater than MINTPS, the subroutine proceeds to functional block 72 where the TSAND Flag is set True. The subroutine then transfers to decision block 74, which will be described below.

The subroutine is disabled if the engine throttle opening is closed by the operator lifting his foot from the accelerator pedal 15. Thus, if the TSAND Flag is True in decision block 66, the subroutine transfers to decision block 76 and compares the actual throttle position TPS to MINTPS. If TPS is greater than MINTPS, the subroutine transfers to decision block 74. If TPS is less than, or equal to, MINTPS, the subroutine transfers to functional block 78 where a subroutine iteration counter SANDCNT is set equal to zero. The subroutine then proceeds to decision block 80 where SANDCNT is compared to zero. If SANDCNT is not zero, the subroutine exits through block 70 back to the TC algorithm. If SANDCNT is zero, as will be the case following functional block 78, the TSAND Flag is set False in functional block 82 and the subroutine then exits through block 70 back to the TC algorithm.

Returning to decision block 74, the iteration counter SANDCNT is compared to a maximum allowable iteration count, which is 255 for the preferred embodiment. It will be appreciated, however, that other values may be utilized for the maximum iteration count. If the counter SANDCNT has reached the maximum allowable count, the subroutine transfers directly to functional block 83 where an incremental increase, $\Delta T_s$, is calculated for the slip threshold $T_s$. If SANDCNT is less than the maximum allowable count, the subroutine transfers to functional block 84 where SANDCNT is incremented by one. The subroutine then proceeds to functional block 83. 30 As described above, an incremental increase $\Delta T$, is calculated for the slip threshold $T_s$ in functional block 83. In general, the incremental increase is a function of time and can be described by the following formula:

$$\Delta T_s = K_S * f(t).$$

Where:

K$_s$ is a scaling constant selected to limit set the maximum value for the incremental increase $\Delta T_s$, and f(t) is a function of time. In the preferred embodiment, f(t) is a linear function of time, however, non-linear functions of time also can be used for f(t).

More specifically, the incremental increase can be calculated in accordance with the relationship:

$$\Delta T_s = K_S * f(SANDCNT).$$

Where:

SANDCNT=the current value contained in the iteration counter.

Thus, the incremental increase becomes greater as the counter increases.

In the preferred embodiment, the calculation of the incremental increase $\Delta T_s$ uses the following formula, which is shown in functional block 83:

$$\Delta T_s = [KSANDMULT*(TPS-MINTPS)*SANDCNT]/(255-MINTPS).$$

Where:

KSANDMULT=a scaling constant selected to limit set the maximum value for the incremental increase $\Delta T_s$ TPS=the actual throttle opening;

MINTPS=the minimum throttle opening;

(TPS−MINTPS)=the incremental throttle opening; and

SANDCNT=the current iteration counter value.

The subroutine then advances to functional block 86 where a new slip threshold $T_s$ is calculated as:

$$T_s = T_{sinitial} + \Delta T_s;$$

where $T_{sinital}$ is the initial value of the slip threshold which is selected to correspond to the characteristics of the particular vehicle platform.

Thus, in the preferred embodiment, the slip threshold is increased linearly to a predetermined maximum value while the traction control is actuated and the vehicle is operating upon a deformable surface. It will be noted that the incremental increase $\Delta T_s$ is directly proportional to the incremental throttle opening and hence also is directly proportional to the amount that the vehicle operator has depressed the accelerator pedal 15. Thus, as the vehicle operator presses down upon the accelerator pedal 15, the slip threshold $T_s$ is increased more rapidly. The factor SANCNT assures that the slip threshold $T_s$ is gradually increased as a linear function of the counter value. As described above, the scaling constant, KSANDMULT, is selected to limit the maximum value of the incremental adder and thereby the maximum value of the increased slip threshold. In the preferred embodiment, the scaling constant, KSANDMULT, is selected to limit the slip threshold $T_s$ to a maximum of ten miles per hour greater that the vehicle speed, however, other values can be used. For example, the scaling constant, KSANDMULT, can be selected to limit the maximum value of the slip threshold $T_s$ to five or 20 miles per hour greater than the vehicle speed.

The operation of the improved TC algorithm is illustrated by the plots shown in FIGS. 9 and 10. FIG. 9 includes plots of vehicle and driven wheel speeds vs. time while FIG. 10 shows the corresponding throttle positions vs. time. The portion of the plots which occur prior to $t_{13}$ is the same as shown in FIG. 6. As described above, at $t_{13}$, the vehicle encounters a deformable surface. As the vehicle speed falls off, the vehicle acceleration passes through zero at $t_{15}$ and becomes negative, indicating vehicle deceleration is occurring. The subroutine monitors the vehicle deceleration and, upon the magnitude of the deceleration exceeding 0.05 g, which is shown at $t_{16}$, begins to increase the slip threshold. Accordingly, the space between the slip control curve 56 and the vehicle speed curve 58 is shown increasing from $t_{16}$ to $t_{18}$. The corresponding increasing throttle opening is shown between $t_{16}$ and $t_{17}$ in FIG. 10. As shown in FIG. 9, the vehicle speed 58 typically falls off slightly while the drive wheel speed increases and eventually begins to increase again.

Figure 11:
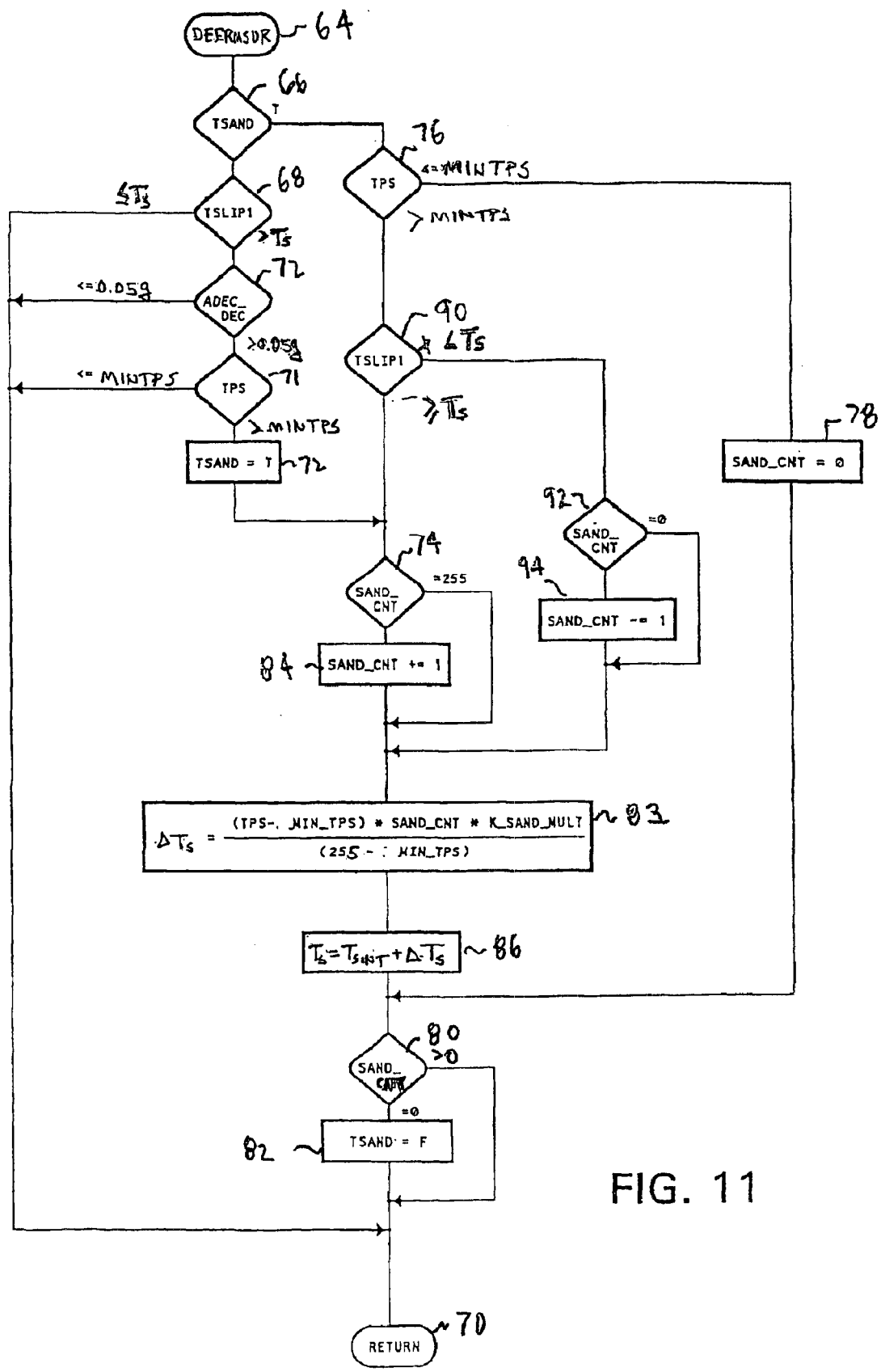
FIG. 11 is a flow chart for an alternate embodiment of the subroutine included in the traction control algorithm illustrated in FIG. 7.

An alternate embodiment of the subroutine DEFRMSUR is illustrated by the flow chart shown in FIG. 11. Blocks shown in FIG. 11 which are the same as blocks shown in FIG. 8 have the same numerical identifiers. The alternate embodiment of the subroutine provides for a linear reduction of the slip threshold $T_s$ when the vehicle operator lifts his foot off of the accelerator pedal 15. As shown in FIG. 11, following a determination that the actual throttle position TPS exceeds MINTPR in decision block 76, the subroutine transfers to decision block 90 where the driven wheel slip is compared to the current slip threshold, $T_s$. If the vehicle operator has lifted his foot from the accelerator pedal 15, the engine throttle will have closed, reducing the speed of the driven wheels. Once the driven wheel speed falls below the current slip threshold, the decision block 90 will transfer the subroutine to decision block 92 where SANDCNT is compared to zero. If SANDCNT is zero, the subroutine proceeds to functional block 83 and continues as described above for the flow chart shown in FIG. 8. If SANDCNT is non-zero in decision block 92, the subroutine transfers to functional block 94 where the SANDCNT is decremented by one. The subroutine then proceeds to functional block 83 and continues as described above for the flow chart shown in FIG. 8.

Figure 12:
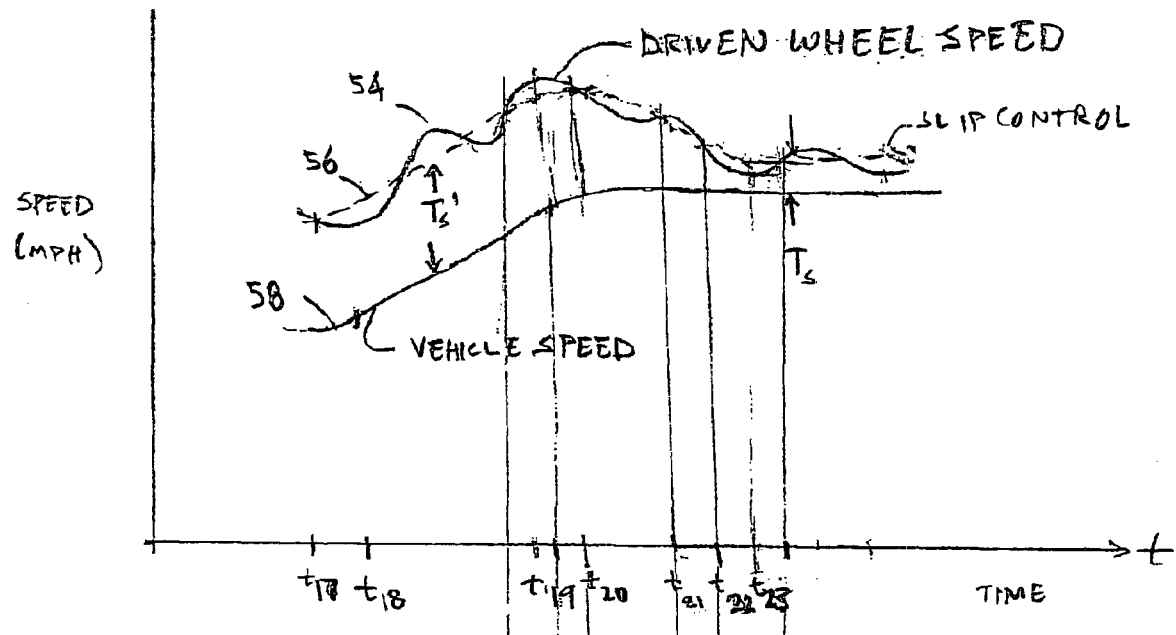
FIG. 12 illustrates the operation the alternate embodiment of the of the traction control algorithm subroutine shown in FIG. 11.
Figure 13:
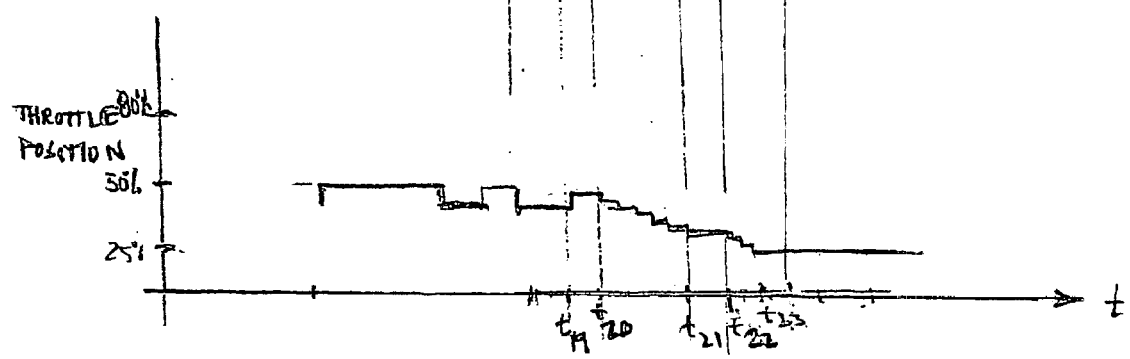
FIG. 13 is a plot showing the engine throttle setting under the control of the traction control algorithm subroutine illustrated in FIG. 11.

The operation of the alternate embodiment of the subroutine is illustrated by the plots of vehicle and driven wheel speeds shown in FIG. 12 and the plot of throttle position shown in FIG. 13. FIG. 12 is intended to be a continuation of the plots shown in FIG. 9. At $t_{19}$, the operator lifts his foot from the accelerator pedal 15. As the engine speed slows, the engine torque output drops and both the vehicle and driven wheel speeds 58 and 54 begin to decrease. At $t_{20}$, the driven wheel speed drops below the slip control curve 56. Accordingly, the subroutine begins reducing the slip threshold $T_s$ which causes corresponding incremental reductions in the throttle position, as shown between $t_{20}$ and $t_{21}$ in FIG. 13. Between $t_{21}$ and $t_{22}$, the driven wheel speed is greater than the slip threshold curve 56; however, the vehicle speed is constant during this time period. Accordingly, the deceleration is zero and the subroutine does not increment the slip threshold. At $t_{22}$, the driven wheel speed again falls below the slip threshold curve 56 and the subroutine continues to decrement the slip threshold until the slip threshold reaches the initial value, $T_{sinitial}$, which is shown to correspond to a 25 per cent throttle opening, at $t_{23}$. At this point, the TC is restored to its original conditions that existed before the vehicle encountered a deformable surface. It will be appreciated that the same sequence will occur if the vehicle transitions from a deformable surface to a non-deformable surface even if the operator does not lift his foot from the accelerator pedal 15.

Figure 14:
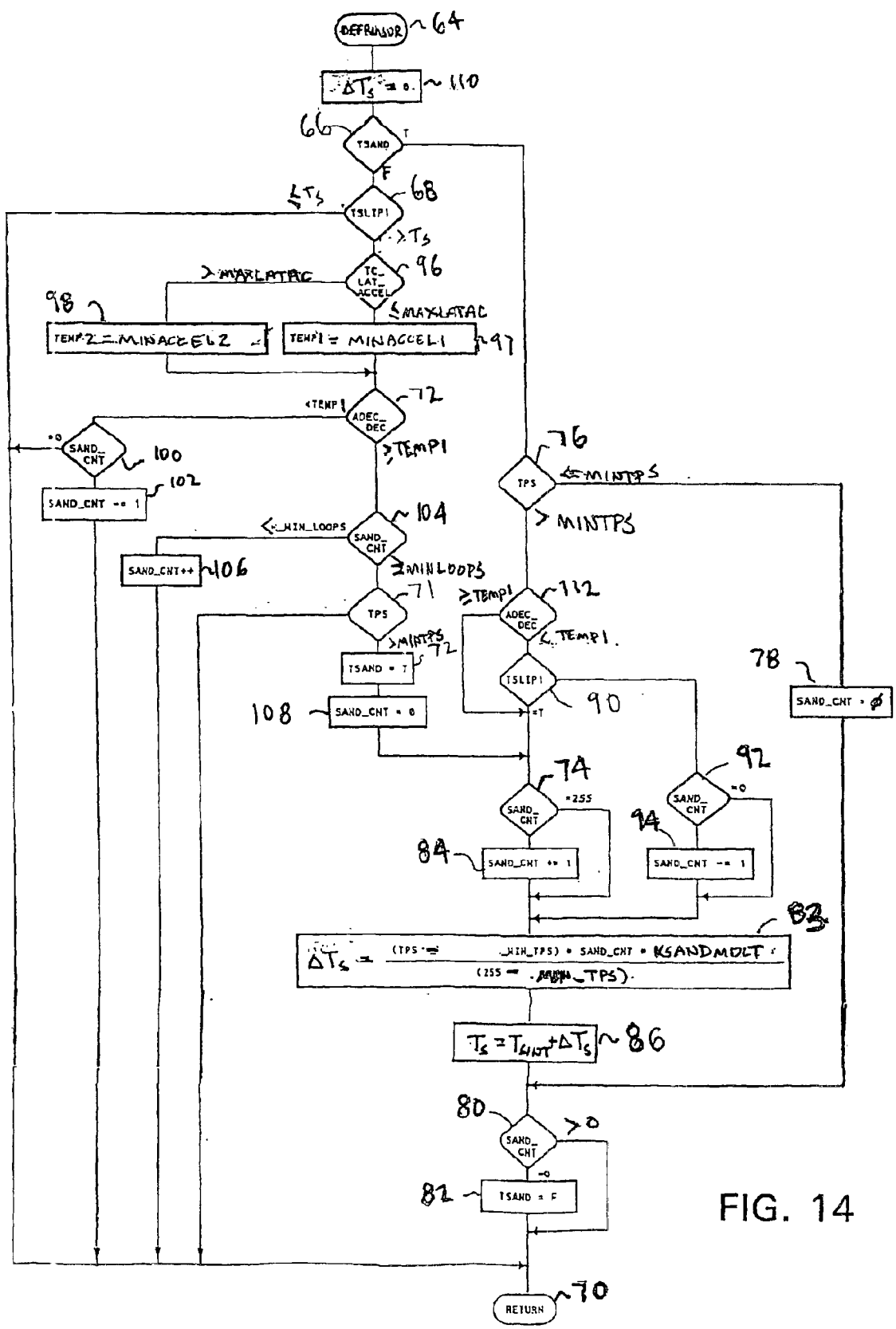
FIG. 14 is another embodiment of the subroutine included in the traction control algorithm illustrated in FIG. 7.

FIG. 14 is a flow chart for another alternate embodiment of the subroutine DEFRMSUR that includes several enhancements. Blocks shown in FIG. 14 which are the same as blocks shown in FIG. 11 have the same numerical identifiers. The inventors have determined that, during hard cornering with the TC actuated, the vehicle may experience deceleration. If the deceleration is great enough, the deformable surface mode of operation may be triggered.

Accordingly, one enhancement includes a lateral acceleration sensor mounted upon the vehicle (not shown) that is connected to the TC microprocessor 22. The TC microprocessor 22 monitors the output of the lateral acceleration sensor and compares the vehicle lateral acceleration to a lateral threshold MAXLATAC in decision block 96. Alternately, the TC microprocessor 22 calculates the vehicle lateral acceleration from the wheel speed sensor signals. Accordingly, with the alternate method of obtaining lateral acceleration, a lateral acceleration sensor is not needed.

The lateral threshold MAXLATAC is selected based upon the specific characteristics of the vehicle. In the preferred embodiment, MAXLATAC is 0.3 g; however, other values also may be used for MAXLATAC. If the lateral acceleration is less than, or equal to, the lateral acceleration threshold MAXLATAC, it is deemed that the cornering is not severe enough to cause sufficient deceleration of the vehicle to trigger the deformable surface mode of operation. Accordingly, the subroutine transfers to functional block 97 where a deceleration variable TEMP1 is set equal to a first predetermined deceleration threshold MINACCEL1 which is the same value used in the subroutines described above. As described above, in the preferred embodiment, MINACCEL1 is equal to 0.05 g. If, in decision block 96, the lateral acceleration is greater than the lateral acceleration threshold MAXLATAC, it is deemed that the cornering is severe enough to cause sufficient deceleration of the vehicle to trigger the deformable surface mode of operation Accordingly, the subroutine transfers to functional block 98 where the deceleration variable TEMP1 is set equal to a second predetermined deceleration threshold MINACCEL2 which is selected based upon the specific characteristics of the vehicle and is greater than MNACCEL1. In the preferred embodiment, MINACCEL2 is equal to 0.1 g. The subroutine then continues to decision block 72 where the vehicle deceleration is compared to the selected deceleration threshold, MINACCEL1 or MINACCEL2, as described above, as part of the criteria for determining whether or not to set the TSAND Flag True in functional block 72. By increasing the vehicle deceleration threshold during hard cornering, the enhanced subroutine avoids false triggering of the deformable surface mode of operation. Because the lateral acceleration of the vehicle is checked every time the subroutine is run, the subroutine will revert to the lower value for the deceleration threshold $T_{dec}$ once the cornering maneuver has been completed.

In decision block 72, the vehicle deceleration is compared to the selected deceleration threshold to determine whether or not the vehicle is operating upon a deformable surface. The enhanced subroutine is operative to gradually return a nonzero SANDCNT to zero by decrementing the iteration counter SANDCNT if the vehicle has not encountered a deformable surface. Thus, in decision block 72, if the magnitude of the vehicle deceleration is less than the deceleration threshold, the vehicle is not operating upon a deformable surface and the subroutine transfers to decision block 100 where the value of SANDCNT is compared to zero. If SANDCNT is zero, the subroutine transfers through exit block 70 back to the TC algorithm. If SANDCNT is non-zero, the subroutine transfers to functional block 102 where SANDCNT is decremented by one. The subroutine then transfers through exit block 70 back to the TC algorithm.

The enhanced subroutine also compensates for any vehicle deceleration that may be detected following impact with a bump in the road surface and for random noise in the wheel speed sensor circuits that may appear as vehicle deceleration. Such signals may falsely trigger the deformable surface mode of operation. Accordingly, the flowchart shown in FIG. 14 includes a delay loop before entering the deformable surface mode of operation to avoid such false entries. The delay loop begins with decision block 104 where SANDCNT is compared a delay threshold MINLOOPS. The value for the delay threshold MINLOOPS is selected based upon the specific characteristics of the vehicle. In the preferred embodiment, MINLOOPS is 50 iterations, which corresponds to a delay of 0.25 seconds. If SANDCNT is less than MINLOOPS, the subroutine transfers to functional block 106 where SNDCNT is incremented by one. The subroutine then transfers through exit block 70 back to the TC algorithm. Once SANDCNT reaches, or exceeds, the value of MINLOOPS, the subroutine transfers from decision block 104 to decision block 71 where the position of the engine throttle is compared to MINTPS, as described above.

The delay loop described above results in the iteration counter SANDCNT containing a value of MINLOOPS when the subroutine finally proceeds to decision block 71. Accordingly, the enhanced subroutine also includes a capability to reinitialize the iteration counter SANDCNT before continuing. The re-initialization is provided by additional functional block 108, where SANDCNT is set equal to zero. Functional block 108 is positioned between functional block 72 where the TSAND Flag is set true and decision block 74 where the current value of SANDCNT is compared to its maximum value. Similarly, the incremental increase, $\Delta T_s$, is set equal to zero in functional block 110 every time the subroutine is called. Accordingly, functional block 110 is positioned immediately following the entrance block 64.

The final enhancement included in FIG. 14 involves checking the vehicle deceleration again before decrementing SANDCNT in functional block 94. Accordingly, a decision block 112 for comparing the magnitude of the vehicle deceleration to the selected deceleration threshold, TEMP1, has been inserted between decision blocks 76 and 90. If the magnitude of the vehicle deceleration is greater than, or equal to, the deceleration threshold, TEMP1, the subroutine transfers directly to decision block 74 and thereby bypasses decision block 90 and the loop for decrementing SANDCNT. If the magnitude of the vehicle deceleration is less than the deceleration threshold, TEMP1, the subroutine transfers to decision block 90 and the loop for decrementing SANDCNT is included, as described above. Thus, with the enhanced subroutine, the counter SANDCNT is decremented only if both the wheel slip has decreased below the increased slip threshold and the vehicle deceleration threshold is not exceeded. Thus, even if the wheel slippage has been corrected, the TC will remain in the deformable surface mode of operation if the vehicle is continuing to decelerate.

The flow chart shown in FIG. 14 includes a number of enhancements. It will be appreciated that the invention also can be practiced with any one or any combination of enhancements shown in FIG. 14. For example, the invention can be practiced without the delay loop initiated by decision block 104. In such a case, decision block 104 and functional blocks 106 and 108 would be omitted.

The preferred embodiment of the invention has been illustrated and described above as requiring satisfaction of three criteria before the slip threshold $T_s$ is increased The three criteria are: the driven wheel slip exceeding a predetermined slip threshold, the magnitude of the vehicle deceleration exceeding a predetermined deceleration threshold and the engine throttle position being greater that a predetermined throttle position. However, it will be appreciated that the invention also can be practiced with activation occurring when only the deceleration threshold is exceeded (not shown). Thus, when the TC system is active, detection of only the magnitude of the vehicle deceleration exceeding a deceleration threshold can trigger the increase of the slip threshold $T_s$ to allow a greater wheel speed relative to vehicle speed. Similarly, it is also contemplated that the invention can be practiced to increase the slip threshold $T_s$ when both the magnitude of the vehicle deceleration and the driven wheel slip exceed the corresponding predetermined thresholds (not shown). Alternately, the invention also can be practiced to increase the slip threshold $T_s$ when both the magnitude of the vehicle deceleration and the throttle position exceed the corresponding predetermined thresholds (not shown).

Figure 15:
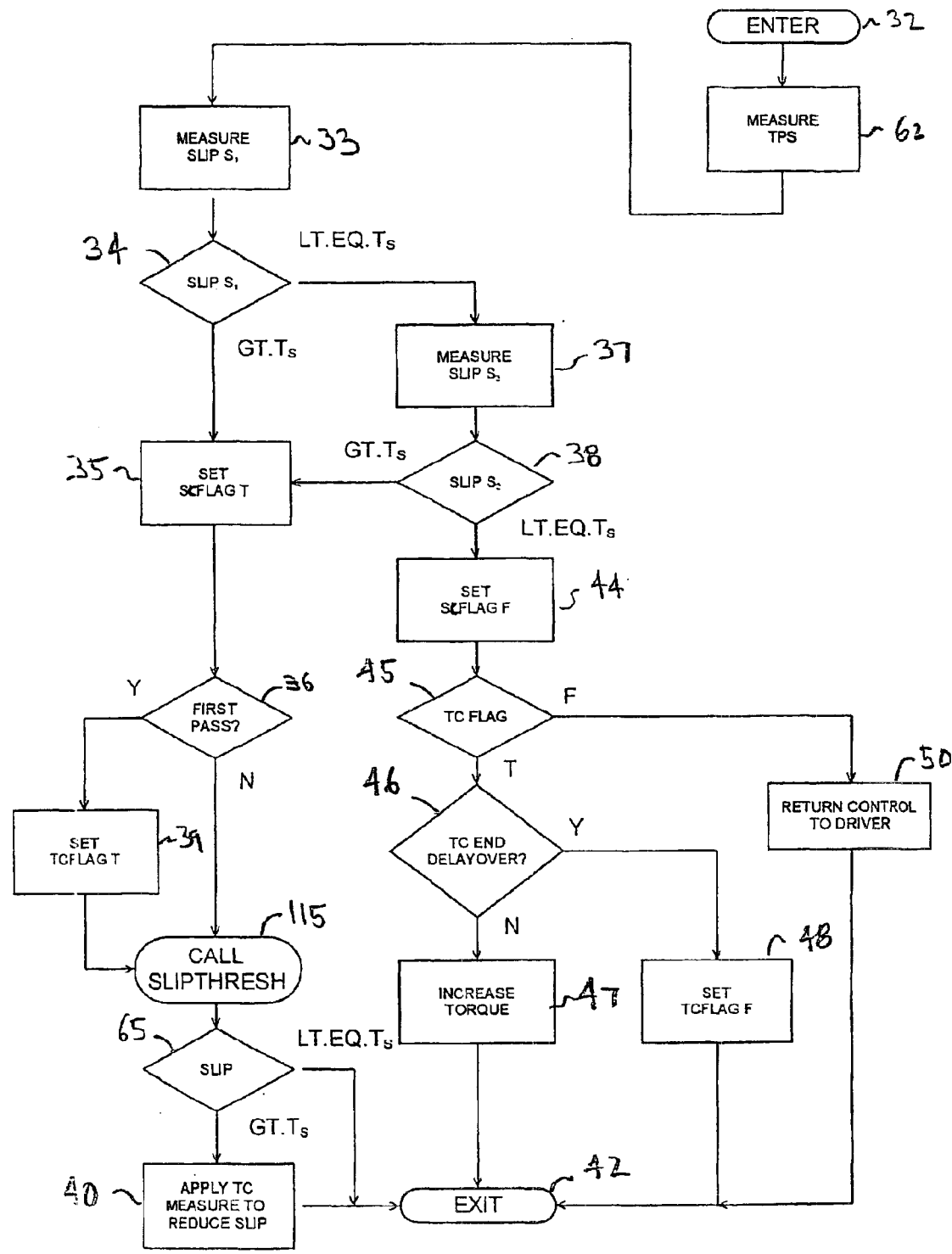
FIG. 15 is an alternate embodiment of the flow chart for an algorithm for the operation of a traction control system shown in FIG. 7.

The invention also contemplates an alternate embodiment of the invention for operation upon non-deformable low mu surfaces. The alternate embodiment increases the slip threshold as a function of the throttle opening position when the traction control is activate. The alternate embodiment is illustrated by the flow charts shown in FIGS. 15 and 16 where blocks that are similar to blocks included in previously discussed flow charts have the same numerical identifiers. FIG. 15 illustrates setting the Slip Control and Traction Control Flags True upon detection of the slip of a driven wheel exceeding a slip threshold $T_s$. In block 115, a SLIP THRESHold subroutine is called which incrementally increases the slip threshold $T_s$. Upon exiting the subroutine SLIPTHRESH, the algorithm continues to decision block 65 to determine if the driven wheel slip still exceeds the increased slip threshold calculated in the subroutine SLIPTHRESH. If the driven wheel slip has fallen below the increased slip threshold, the algorithm exits through block 42. If the driven wheel speed exceeds the increased slip threshold, the algorithm proceeds to functional block 40 where the slip is controlled to the increased slip threshold calculated in the subroutine SLIPTHRESH. Following the slip control step, the algorithm exits through block 42.

Figure 16:
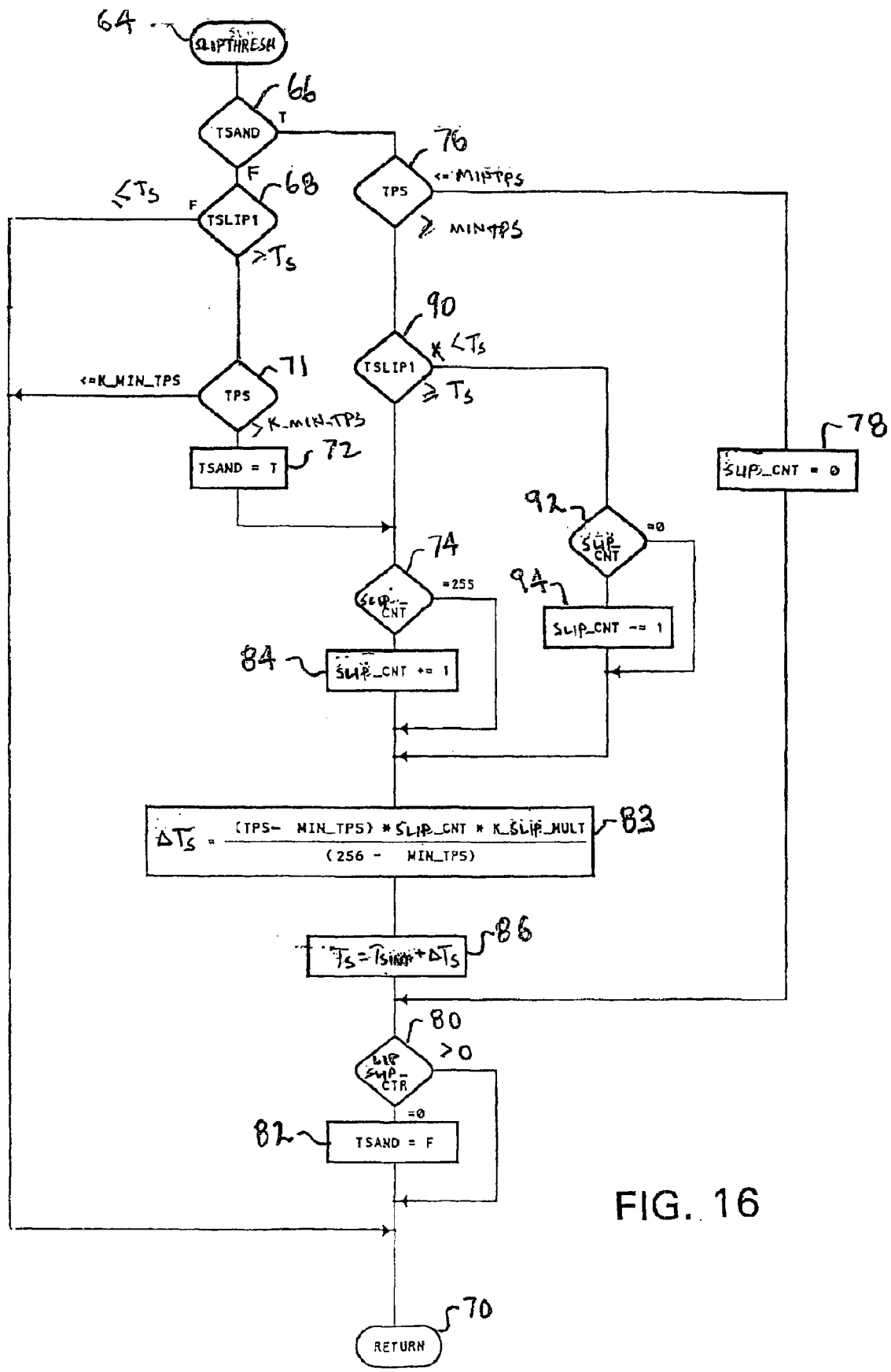
FIG. 16 is a flow chart for a subroutine included in the flow chart shown in FIG. 15.

The subroutine SLIPTHRESH is illustrated by the flow chart shown in FIG. 16.

The subroutine SLIPTHRESH is similar to the subroutine shown in FIG. 11, except that the vehicle deceleration criteria has been omitted While the preferred functional relationship for calculating the incremental change in the slip is illustrated in functional block 83, it will be appreciated that, generally, the incremental change is a function of time, as discussed above. As shown in FIG. 16, the incremental change in the slip, $\Delta T_s$, is limited by a scaling factor K_SLIP_MULT to a value selected to correspond to the characteristics of the particular vehicle platform. In the preferred embodiment, the scaling factor K_SLIP_MULT allows the slip threshold $T_s$ to increase from two miles per hour to four miles per hour; however, other values for the scaling factor can be used. Thus, the alternate embodiment shown in FIGS. 15 and 16 allows the vehicle operator to increase the amount of driven wheel spin allowed by the TC system on a low mu road surface by depressing the accelerator pedal 15.

It is further contemplated that the scaling factor K_SLIP_MULT can be a function of the throttle opening (not shown). In such a case, a plurality of scaling factors are stored in a table within the microprocessor memory. A particular scaling factor is then selected which corresponds to a range of throttle opening settings. Thus, the maximum allowed driven wheel spin can be a function of the throttle opening.

While the preferred embodiment has been illustrated and described as utilizing the throttle opening as a criteria, it will be appreciated that the invention also can be practiced using the vehicle operator's torque request in place of throttle opening. For example, other vehicle parameters which are indicative of the torque requirement, such as the amount of fuel flowing to the engine or the setting of the spark, could be used in place of the throttle opening.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the present invention has been described and illustrated as being included in a stand alone traction control system, it will be appreciated that the invention also can be included in an anti-lock brake system or vehicle stability control system.

What is claimed is:

1. A traction control system for a vehicle comprising:
    a plurality of wheel speed sensors adapted to sense the speed of associated vehicle wheels, said wheel speed sensors operative to generate wheel speed signals; and
    a controller electrically connected to said wheel speed sensors, said controller operative to monitor said wheel speed signals and to calculate a wheel slip for each of said driven wheels and a vehicle deceleration, said controller also operative upon a driven wheel slip exceeding a slip threshold to reduce said driven wheel slip below said slip threshold, said controller further operative while said driven wheel slip exceeds said slip threshold to monitor said vehicle deceleration and to generate a deformable surface signal upon said vehicle deceleration exceeding a predetermined vehicle deceleration threshold.

2. A traction control system according to claim 1 wherein said controller is further operable upon generating said deformable surface signal to increase said slip threshold whereby advancement of the vehicle across the deformable surface is enhanced.

3. A traction control system for a vehicle comprising:
    a plurality of wheel speed sensors adapted to sense the speed of associated vehicle wheels, said wheel speed sensors operative to generate wheel speed signals; and
    a microprocessor electrically connected to said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative to monitor said vehicle deceleration and to increase said slip threshold upon said vehicle deceleration exceeding a predetermined vehicle deceleration threshold whereby advancement of the vehicle across the deformable surface is enhanced.

4. A traction control system according to claim 3 wherein said slip threshold is increased as a function of time.

5. A traction control system for a vehicle comprising:
    a plurality of wheel speed sensors adapted to sense the speed of associated vehicle wheels, said wheel speed sensors operative to generate wheel speed signals; and
    a microprocessor electrically connected to said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative to monitor said vehicle deceleration and to increase said slip threshold as a function of time upon said vehicle deceleration exceeding a predetermined vehicle deceleration threshold, said microprocessor including a maximum limit for said slip threshold whereby said slip threshold is increased to a maximum slip threshold limit and then held at said maximum slip threshold limit.

6. A traction control system according to claim 5 wherein said slip threshold is increased by a slip threshold increment, said slip threshold increment being calculated in accordance with the formula:

$$\Delta T_s = K_S * f(SANDCNT);$$

where $\Delta T_s$=said slip threshold increment;
$K_S$ is a constant to scale the maximum value for the incremental increase $\Delta T_s$; and
SANDCNT=current value of an iteration counter.

7. A fraction control system according to claim 6 wherein said microprocessor is operative upon said vehicle deceleration falling below said deceleration threshold to reduce said slip threshold back to an initial slip threshold.

8. A traction control system for a vehicle comprising:
a plurality of wheel speed sensors adapted to sense the speed of associated vehicle wheels, said wheel speed sensors operative to generate wheel speed signals; and
a microprocessor electrically connected to said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor farther operative while said driven wheel slip exceeds said slip threshold to monitor said vehicle deceleration and to increase said slip threshold upon said vehicle deceleration exceeding a predetermined vehicle deceleration threshold whereby advancement of the vehicle across the deformable surface is enhanced.

9. A traction control system according to claim 8 wherein said slip threshold is increased as a function of time.

10. A traction control system comprising:
a plurality of wheel speed sensors adapted to sense the speed of associated vehicle wheels, said wheel speed sensors operative to generate wheel speed signals; and
a microprocessor electrically connected to said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative while said driven wheel slip exceeds said slip threshold to monitor said vehicle deceleration and to increase said slip threshold as a function of time upon said vehicle deceleration exceeding a predetermined vehicle deceleration threshold, said slip threshold being increased by a slip threshold increment, said slip threshold increment being calculated in accordance with the formula:

$$\Delta T_s = K_S * f(SANDCNT);$$

where $\Delta T_s$=said slip threshold increment;
$K_S$ is a constant to scale the maximum value for the incremental increase $\Delta T_s$; and
SANDCNT=current value of an iteration counter.

11. A traction control system according to claim 10 wherein said microprocessor is operative upon said driven wheel slip falling below said slip threshold and said vehicle deceleration falling below said predetermined deceleration threshold to reduce said slip threshold back to an initial slip threshold.

12. A traction control system for a vehicle comprising:
a torque requirement sensor adapted to sense a torque requirement of a vehicle engine;
a plurality of wheel speed sensors adapted to sense the speed of associated vehicle wheels, said wheel speed sensors operative to generate wheel speed signals; and
a microprocessor electrically connected to said torque requirement sensor and said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative to monitor said vehicle deceleration and said engine torque requirement and to increase said slip threshold upon said vehicle deceleration exceeding a predetermined vehicle deceleration threshold and said engine torque requirement exceeding a predetermined torque threshold.

13. A traction control system according to claim 12 wherein said slip threshold is increased as a function of time.

14. A traction control system comprising:
a torque requirement sensor adapted to sense a torque requirement of a vehicle engine;
a plurality of wheel speed sensors adapted to sense the speed of associated vehicle wheels, said wheel speed sensors operative to generate wheel speed signals; and
a microprocessor electrically connected to said torque requirement sensor and said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative to monitor said vehicle deceleration and torque requirement arid to increase said slip threshold as a function of time upon said vehicle deceleration exceeding a predetermined vehicle deceleration threshold and said torque requirement exceeding a predetermined torque threshold, said slip threshold being increased by a slip threshold increment, said slip threshold increment being calculated in accordance with the formula:

$$\Delta T_s = K_S * f(SANDCNT);$$

where $\Delta T_s$=said slip threshold increment;
$K_S$ is a constant to scale the maximum value for the incremental increase $\Delta T_s$; and
SANDCNT=current value of an iteration counter.

15. A traction control system according to claim 14 wherein said torque requirement is proportional to an engine throttle opening and further wherein said minimum torque threshold is proportional to a minimum engine throttle opening.

16. A traction control system according to claim 15 wherein said slip threshold is increased by a slip threshold increment, said slip threshold increment being calculated in accordance with the formula:

$$\Delta T_s = [KSANDMULT*(TPS-MINTQR)*SANDCNT]/(256-MINTPS);$$

where $\Delta T_s$=said slip threshold increment;
KSANDMULT=a constant to scale the maximum value for the incremental increase $\Delta T_s$;
TPS=actual throttle opening;
MINTQR=said predetermined minimum torque threshold; and
SANDCNT=current value of an iteration counter.

17. A traction control system according to claim 16 further including a maximum limit for said slip threshold whereby said slip threshold is increased by said slip threshold increment to a maximum slip threshold limit and then held at said maximum slip threshold limit.

18. A traction control system according to claim 17 wherein said microprocessor is operative upon said vehicle deceleration falling below said deceleration threshold to reduce said slip threshold back to an initial slip threshold.

19. A traction control system for a vehicle comprising:
a torque requirement sensor adapted to sense a torque requirement of a vehicle engine;
a plurality of wheel speed sensors adapted to sense the speed of associated vehicle wheels, said wheel speed sensors operative to generate wheel speed signals; and
a microprocessor electrically connected to said torque requirement sensor and said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative, while said driven wheel slip exceeds said slip threshold, to monitor said vehicle deceleration and said engine torque requirement and to increase said slip threshold upon said vehicle deceleration exceeding a predetermined vehicle deceleration threshold and said engine torque requirement exceeding a predetermined torque threshold.

20. A traction control system according to claim 19 wherein said slip threshold is increased as a function of time.

21. A traction control comprising:
a torque requirement sensor adapted to sense a torque requirement of a vehicle engine;
a plurality of wheel speed sensors adapted to sense the speed of associated vehicle wheels, said wheel speed sensors operative to generate wheel speed signals; and
a microprocessor electrically connected to said torque requirement sensor and said wheel speed sensors, said microprocessor operative to monitor said wheel speed signals and calculate a wheel slip for each of said driven wheels and a vehicle deceleration, said microprocessor also operative upon a driven wheel slip exceeding a slip threshold to reduce said driven wheel slip below said slip threshold, said microprocessor further operative, while said driven wheel slip exceeds said slip threshold, to monitor said vehicle deceleration and torque requirement and to increase said slip threshold as a function of time upon said vehicle deceleration exceeding a predetermined vehicle deceleration threshold and said torque requirement exceeding a predetermined torque threshold, said slip threshold being increased by a slip threshold increment, said slip threshold increment being calculated in accordance with the formula:

$$\Delta T_s = K_S * f(SANDCNT);$$

where $\Delta T_s$=said incremental slip threshold increase;
$K_S$ is a constant to scale the maximum value for the incremental increase $\Delta T_s$; and
SANDCNT=current value of an iteration counter.

22. A traction control system according to claim 21 wherein said slip threshold is increased by a slip threshold increment, said slip threshold increment being calculated in accordance with the formula:

$$\Delta T_s = [KSANDMULT*(TPS-MINTQR)*SANDCNT]/(256-MINTPS);$$

where $\Delta T_s$=said incremental slip threshold increase;
KSANDMULT=a constant to scale the maximum value for the incremental increase $\Delta T_s$;
TPS=actual throttle opening;
MINTQR=said predetermined minimum torque threshold; and
SANDCNT=an iteration counter.

23. A traction control system in accordance with claim 22 wherein said deceleration threshold is a first deceleration threshold and further wherein said microprocessor is operative to calculate a lateral acceleration of the vehicle and, upon detecting a vehicle lateral acceleration in excess of a predetermined lateral acceleration threshold, to replace said first deceleration threshold with a second deceleration threshold, said second deceleration threshold being greater than said first deceleration threshold.

24. A traction control system in accordance with claim 23 further including a predetermined time delay which is actuated upon said vehicle deceleration exceeding said deceleration threshold and runs prior to any increase of said slip threshold.

25. A traction control system according to claim 24 wherein said microprocessor is operative upon said driven wheel slip falling below said slip threshold and said vehicle deceleration falling below said deceleration threshold to reduce said slip threshold.

26. A traction control system for a vehicle comprising:
a torque requirement sensor adapted to sense a torque requirement of a vehicle engine;
a plurality of wheel speed sensors adapted to sense the speed of associated vehicle wheels, said wheel speed sensors operative while said driven wheel exceeds said slip threshold to generate wheel speed signals; and
a microprocessor electrically connected to said torque requirement sensor and said wheel speed sensors, said microprocessor operative to monitor said wheel speed signals and calculate a wheel slip for each of said driven wheels, said microprocessor also operative upon a driven wheel slip exceeding a slip threshold to reduce said driven wheel slip below said slip threshold, said microprocessor further operative, while said driven wheel exceeds said slip threshold, to monitor said engine torque requirement and to increase said slip threshold solely upon said engine torque requirement exceeding a predetermined torque threshold.

27. A traction control system according to claim 26 wherein said slip threshold is increased as a function of time.

28. A traction control system according to claim 27 wherein said engine torque requirement is a function of a vehicle engine throttle opening.

* * * * *

UNITED STATES PATENT AND TRADEMARK OFFICE
CERTIFICATE OF CORRECTION

PATENT NO. : 6,882,921 B2
DATED : April 19, 2005
INVENTOR(S) : Douglas J. Priemer et al.

It is certified that error appears in the above-identified patent and that said Letters Patent is hereby corrected as shown below:

Column 15,
Line 23, delete "fraction" and insert -- traction --.
Line 38, delete "farther" and insert -- further --.

Column 16,
Line 50, delete "arid" and insert -- and --.

Signed and Sealed this

Fourteenth Day of June, 2005

JON W. DUDAS
*Director of the United States Patent and Trademark Office*